(12) United States Patent
Ether

(10) Patent No.: US 7,484,126 B2
(45) Date of Patent: Jan. 27, 2009

(54) POWER SYSTEM PROVIDING POWER TO AT LEAST ONE COMPONENT INCLUDING CIRCUIT FOR MINIMIZING EFFECTS OF POWER INTERRUPTIONS AND METHOD OF USING SAME

(75) Inventor: Russ Ether, Niles, MI (US)

(73) Assignee: Honeywell International Inc., Morristown, NJ (US)

( * ) Notice: Subject to any disclaimer, the term of this patent is extended or adjusted under 35 U.S.C. 154(b) by 543 days.

(21) Appl. No.: 11/053,389

(22) Filed: Feb. 8, 2005

(65) Prior Publication Data

US 2006/0179332 A1 Aug. 10, 2006

(51) Int. Cl.
G06F 11/00 (2006.01)

(52) U.S. Cl. .................................................. 714/36

(58) Field of Classification Search ................ 714/36; 713/1, 2
See application file for complete search history.

(56) References Cited

U.S. PATENT DOCUMENTS

| | | | | |
|---|---|---|---|---|
| 3,581,073 | A * | 5/1971 | Visher | 701/207 |
| 4,648,031 | A | 3/1987 | Jenner | |
| 4,979,143 | A * | 12/1990 | Takano et al. | 714/14 |
| 5,315,161 | A | 5/1994 | Robinson et al. | |
| 5,410,713 | A * | 4/1995 | White et al. | 713/330 |
| 5,539,876 | A | 7/1996 | Saito et al. | |
| 5,557,777 | A | 9/1996 | Culbert | |
| 5,581,692 | A | 12/1996 | Nevitt et al. | |
| 5,634,000 | A | 5/1997 | Wicht | |
| 5,831,347 | A | 11/1998 | Landis et al. | |
| 5,935,242 | A * | 8/1999 | Madany et al. | 713/1 |
| 5,978,913 | A * | 11/1999 | Broyles et al. | 713/2 |
| 6,009,541 | A * | 12/1999 | Liu et al. | 714/36 |
| 6,014,744 | A * | 1/2000 | McKaughan et al. | 713/2 |
| 6,272,626 | B1 | 8/2001 | Cobbett | |
| 6,457,136 | B1 | 9/2002 | Sugiura | |
| 6,640,316 | B1 * | 10/2003 | Martin et al. | 714/36 |
| 6,721,885 | B1 * | 4/2004 | Freeman et al. | 713/2 |
| 6,732,299 | B1 | 5/2004 | Mbarki | |
| 6,754,817 | B2 * | 6/2004 | Khatri et al. | 713/1 |
| 6,819,539 | B1 | 11/2004 | Wright et al. | |
| 6,839,867 | B2 * | 1/2005 | Nunn et al. | 714/36 |
| 7,010,723 | B2 * | 3/2006 | Pelner | 714/36 |
| 2002/0062455 | A1 | 5/2002 | Lee | |

(Continued)

Primary Examiner—Marc Duncan
(74) Attorney, Agent, or Firm—Birch, Stewart, Kolasch & Birch, LLP

(57) ABSTRACT

A power system (10) includes a power source (12) having a power output (14) and a signal output (16) and is shiftable between an off state and an on state supplying a given power from the power output (14), the power source (12) producing a signal on the signal output (16) for a period of time when the power source (12) shifts from the off state to the on state and at least one component (18, 24) having a power input (20, 26) and a signal input (22, 28), the at least one component (18, 24) shifting to a diagnostic state when power at the power input (20, 26) rises from below the given power level to at least the given power level and a signal is present on the signal input (22, 28) and shifting to a second state when power at the power input (20, 26) rises from below the given power to at least the given power level and no signal is present on the signal input (22, 28).

16 Claims, 2 Drawing Sheets

U.S. PATENT DOCUMENTS

| | | |
|---|---|---|
| 2003/0110415 A1 | 6/2003 | Podgorsky et al. |
| 2004/0039960 A1 | 2/2004 | Kassayan |
| 2004/0103343 A1 | 5/2004 | Wu et al. |
| 2007/0168739 A1* | 7/2007 | Wang et al. .................. 714/36 |

* cited by examiner

US 7,484,126 B2

POWER SYSTEM PROVIDING POWER TO AT LEAST ONE COMPONENT INCLUDING CIRCUIT FOR MINIMIZING EFFECTS OF POWER INTERRUPTIONS AND METHOD OF USING SAME

GOVERNMENT RIGHTS STATEMENT

The United States Government has acquired certain rights in this invention through Government Contract No. Z20544 awarded by the U.S. Department of Advanced Research Projects Agency.

FIELD OF THE INVENTION

The present invention is directed to a power system that provides power to at least one component configured to perform a self-test after a power interruption and method of operating such a power system, and, more specifically to a power system that provides power and a control signal to at least one component, wherein the component is configured to perform a self-test after a power interruption only if the signal from the power source is detected and a method of operating such a system.

BACKGROUND OF THE INVENTION

When digital processor based electronic equipment is powered up, it generally goes through a series of self checks variously known as Power-Up Self Test (POST) or Start-up Built-in Test (SBIT). These self-checks often include procedures that detect faults that could become latent failures or cause malfunctions of a system.

Running a POST or SBIT takes a certain amount of time. During a normal power-up, the amount of time is generally not critical because the system is generally not in a state in which operation of the equipment is critical. However, if the equipment is in an operating state and a power interruption occurs, it may be desirable to return the equipment to an operating state as quickly as possible to avoid unsafe operating conditions. The effects of waiting for a self check to run under such conditions range from inconvenient to disastrous. This would be particularly true, for example, if the digital processors at issue are controlling a moving vehicle such as an aircraft. It is therefore desirable to provide a power system having components that do not perform their normal power up self tests after certain types of power interruptions.

SUMMARY OF THE INVENTION

These problems and others are addressed by the present invention which comprises, in a first aspect, a power system that includes a power source having a power output and a signal output that is shiftable between an off state and an on state supplying a given power from the power output. The power source also produces a signal on the signal output for a period of time when the power source shifts from the off state to the on state. The system further includes at least one component having a power input and a signal input wherein the component shifts to a diagnostic state when power at the power input rises from below the given power to at least the given power and a signal is present on the signal input and shifts to a second state, such as an operational state, when power at the power input rises from below the given power to at least the given power and no signal is present on the signal input.

Another aspect of the invention comprises a method of operating a power system comprising a power source for supplying power to at least one component configured to perform a power up self test upon startup. The method involves operatively connecting a signal output on the power source to a signal input on the at least one component, sending a signal from the power source to the at least one component over the signal input for a period of time when the power source shifts to a power supplying state, and allowing the at least one component to perform the power up self test after a power interruption only if the signal is present on the signal input.

BRIEF DESCRIPTION OF THE DRAWINGS

These and other aspects and features of the present invention will be better understood after a reading of the following detailed description together with the following drawing wherein.

DETAILED DESCRIPTION

Figure 1:
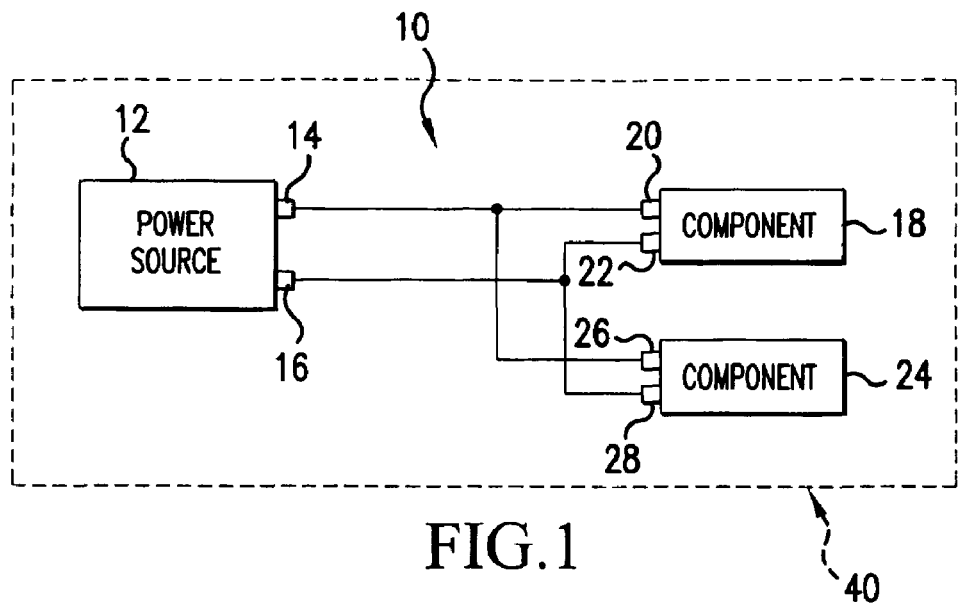
FIG. 1 schematically illustrates a power system including a power supply and first and second components connected to the power supply according to an embodiment of the present invention.

Referring now to the drawings, wherein the showings are for purposes of illustrating a preferred embodiment of the invention only and not for the purpose of illustrating same, FIG. 1 shows a power system designated generally by the numeral 10 that includes a power supply 12 having a power output 14 and a signal output 16. Power system 10 further includes a first component 18 having a power input 20 connected to power output 14 of power supply 12 and a signal input 22 connected to signal output 16 of power supply 12. A second component 24 includes a power input 26 connected to power output 14 of power supply 12 and a signal input 28 connected to signal output 16 of power supply 12. It should be understood that additional components can be connected to power supply 12 in a similar manner. The system may be found, for example, in an aircraft 40.

Figure 2A:
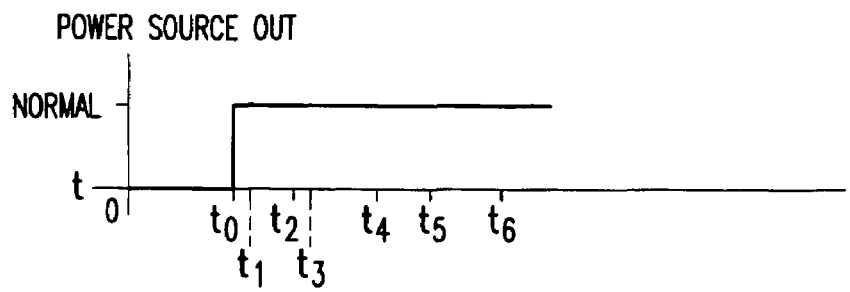
FIG. 2a is a graph illustrating the power level at the power supply output at a plurality of times.
Figure 2B:
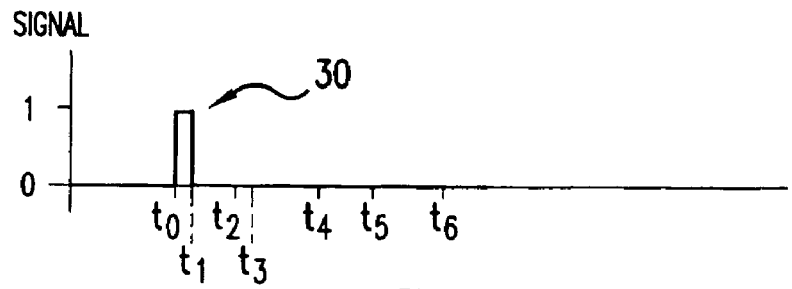
FIG. 2b is a graph of the signal output on the signal line output of the power supply at the plurality of times.
Figure 2C:
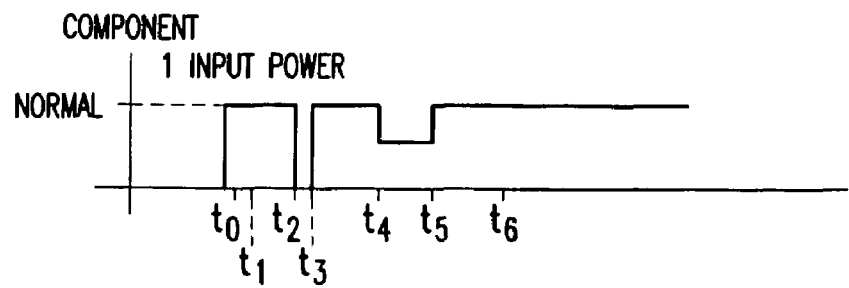
FIG. 2c is a graph of the power level at the power input of component 1 at the plurality of times.

Referring now to FIGS. 2a-2c, power supply 12 is shiftable between a first or off state and a second or on state. FIG. 2a illustrates this shift occurring at time $t_0$ at which time the power output from power supply 12 increases from 0 (or some other minimal level) to a normal operating level. As illustrated in FIG. 2b, at or shortly before time $t_0$, a power supply 12 produces an output signal 30 from signal output 16 for a period of time which is may be on the order of several milliseconds. In the present embodiment, the signal is a logically high digital signal which is received at signal inputs 22, 28 of first and second components 18, 24.

First and second components 18, 24 are configured to perform a power up self test under normal start up conditions but to forego this normal self test under abnormal conditions when it is desirable for components 18, 24 to become fully operational quickly. From FIG. 2b it can be seen that a signal is sent from power supply 12 to the first and second signal inputs 22, 28 of first and second components 18, 24 only for a brief period of time, from time $t_1$ and time $t_2$. First and second components 18, 24 will only perform a normal power up self test if they detect a signal on their respective signal inputs 22, 28. Therefore, if the power level at power inputs 20 of first component 18 rises to a normal operating level from below a normal operating level and no signal is present on signal input 20, component 18 will not perform a normal power up self test. If a signal is present on signal input 22 of first component 18 at a time when the power detected at power input 20 rises from below a normal operating level to a normal operating level, first component 18 will perform a normal power up self test as the presence of the signal at signal input 22 indicates that a normal power up is occurring.

As illustrated in FIG. 2c, the power level input to power input 20 of first component 18 rises to a normal level at time t0 along with the power output of power source 12. The drop in the output signal from power supply signal output 16 does not affect either the power level at power source power output 14 or the power level at first component power input 20.

FIG. 2c illustrates several power level fluctuations that may be seen by first component 18 which may be caused, for example, by lighting or other external electromagnetic signals, or by transient problems in the power system 10. FIG. 2c illustrates the power at power input 20 of first component 18 falling to 0 from time $t_1$ to time $t_2$ and then returning to its original level. From the constant power level produced by power source 12 during this time interval, as shown in FIG. 2a, it can be seen that this power drop was not cause by a power fluctuation in power supply 12 but rather by an external problem such as lighting. Because no signal is present at signal input 22, as seen in FIG. 2b, first component 18 does not perform a normal power up self test when the power at power input 20 rises from below a normal operating level to an operating level.

Referring again to FIG. 2c, the power level at power input 20 can be seen to decrease at time $t_4$ from a normal level to a lower-than-normal level before returning to normal at time $t_5$. As is evident from FIG. 2b, neither the power output from power supply 12 nor the signal from power supply signal output 16 changes, and therefore, first component 18 does not perform a power up self test at time t5 when the power level at power input 20 returns to normal.

Second component 24 functions in the same manner as first component 18 and therefore its operation will not be described separately. However, it should be noted that power fluctuations may affect first component 18 and second component 24 either jointly or individually. Therefore, it is possible that, for example, second component 24 will not experience a power drop at time t2.

As discussed above, it is desirable for first component 18 to become operational quickly. Therefore, in some cases, when the power level at power input 20 increases to a normal power level, first component 18 will immediately return to full functionality. However, for certain components, such as components that control moving parts, certain readying steps must be carried out when power is applied before the component can become fully operational. Such steps do not diagnose conditions of the component, but may comprise, for example, returning an actuator to an initial position so that its position thereafter can be accurately detected. Moreover, other components may require an abbreviated self-test before becoming operational and will perform such an abbreviated test before becoming fully operational. In any case, components used in connection with this embodiment of the invention will become operational more quickly when no signal is present on first signal input 22 that when a signal is present.

Figure 3:
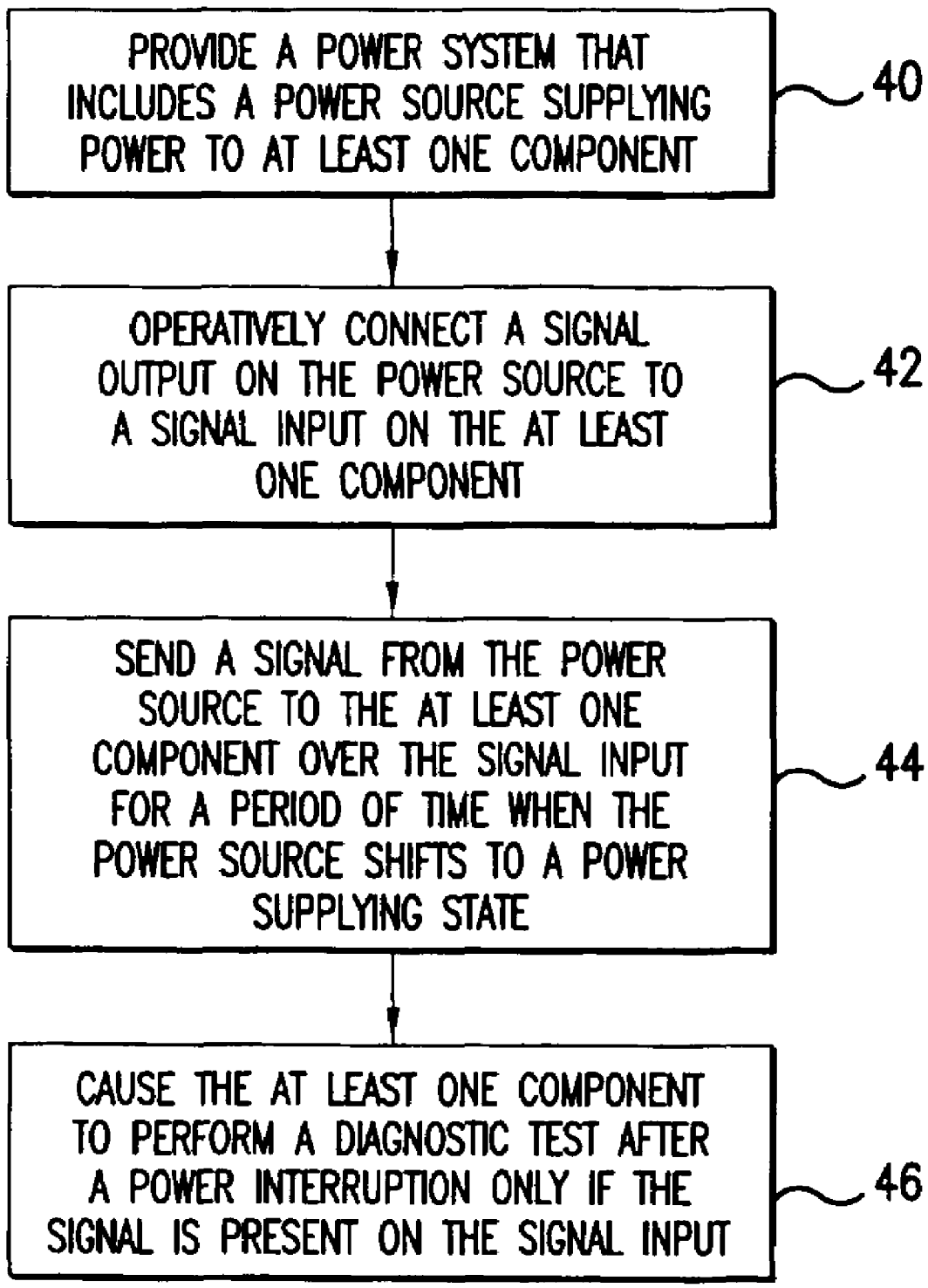
FIG. 3 is a flow chart illustrating a method according to an embodiment of the present invention.

FIG. 3 illustrates a method according to an embodiment of the present invention that includes the a step of providing a power system that includes a power source supplying power to at least one component at a step 40, a step of operatively connecting a signal output on the power source to a signal input on the at least one component at a step 42, sending a signal from the power source to the at least one component over the signal input for a period of time when the power source shifts to a power supplying state at a step 44 and causing the at least one component to perform a diagnostic test after a power interruption only if the signal is present on the signal input at a step 46.

The present invention has been described in terms of an embodiment. However, numerous additions and modifications will become apparent to those skilled in the relevant arts upon a reading of the foregoing description. It is intended that all such modifications and improvements form a part of the present invention to the extent that they fall within the scope of the several claims appended hereto.

I claim:

1. A power system comprising:
    a power source having a power output and a signal output and shiftable between an off state and an on state supplying a given power from said power output, said power source producing a signal on said signal output for a period of time when said power source shifts from the off state to the on state;
    a plurality of components, each component having a power input and a signal input and each component shifting to a diagnostic state when power at said power input rises from below said given power to at least said given power and a signal is present on said signal input and shifting to a second state when power at said power input rises from below said given power to at least said given power and no signal is present on said signal input.

2. The power system of claim 1 wherein said second state comprises an operational state.

3. The power system of claim 1 wherein said second state comprises an abbreviated diagnostic state followed by an operational state.

4. The power system of claim 1 wherein said second state comprises a non-diagnostic readying state followed by an operational state.

5. The power system of claim 1 wherein said period of time is less than one second.

6. The power system of claim 1 wherein said period of time is less than 10 milliseconds.

7. The power system of claim 1 wherein said at least one component is in a powered down state when power is not being applied to said power input.

8. The power system of claim 1 wherein said plurality of components comprise a first component and a second component operating independently of said first component.

9. An aircraft including a power system according to claim 1.

10. The power system of claim 1, wherein the power source includes a single power source.

11. In a power system comprising a power source for supplying power to a plurality of components configured to perform a power up self test upon startup, a method comprising the steps of:
    operatively connecting a signal output on the power source to a signal input on each component;
    sending a signal from the power source to the each component over the signal input for a period of time when the power source shifts to a power supplying state; and allowing the each component to perform the power up self test after a power interruption only if the signal is present on the signal input.

12. The method of claim 11 wherein said step of sending a signal from the power source to the each component over the signal input for a period of time when the power source shifts to a power supplying state comprises the step of sending a digital signal from the power source to the each component over the signal input for a period of time when the power source shifts to a power supplying state.

13. The method of claim 12 wherein said step of sending a digital signal comprises the step of sending a logically high signal.

14. The method of claim 12 wherein said step of causing the each component to perform a diagnostic test after a power interruption comprises the step of causing only ones of the plurality of components experiencing a power interruption to perform a diagnostic test after a power interruption.

15. The method of claim 12 including the additional step of performing an abbreviated diagnostic test after a power interruption if no signal is present on the signal input.

16. The method of claim 11, wherein the power source includes a single power source.

* * * * *